Jan. 23, 1951    K. J. KNUDSEN    2,539,143
DUAL MOVEMENT ELECTRICAL METER
Filed March 3, 1947
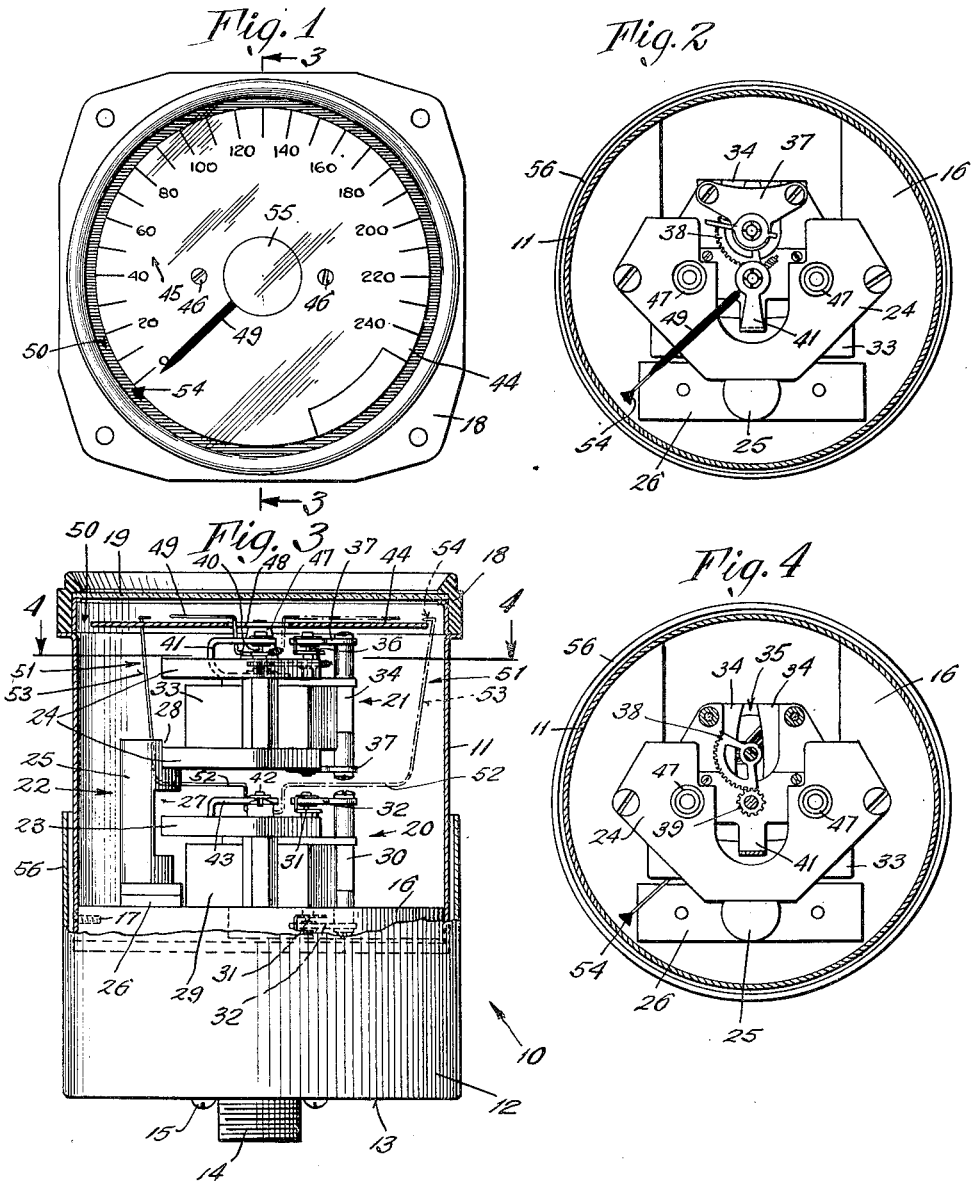
INVENTOR.
Knud J. Knudsen
BY
Johnson, Kline and Hensel
ATTORNEYS Patented Jan. 23, 1951

2,539,143

UNITED STATES PATENT OFFICE 2,539,143

DUAL MOVEMENT ELECTRICAL METER

Knud J. Knudsen, Naugatuck, Conn., assignor to The Lewis Engineering Company, Naugatuck, Conn., a corporation of Connecticut Application March 3, 1947, Serial No. 732,028

3 Claims. (Cl. 171—95)

This invention relates to electric meters.

An object of the invention is to provide an improved dual meter, that is, a meter with a pair of separate movements, which is of simple and compact construction so arranged as to require a minimum of space on an instrument pad.

Another object of the invention is to provide a dual meter as above which is easily and quickly read.

A still further object of the invention is to provide a dual meter of the above type which is sturdy and rugged in construction and reliable at all times.

Still another object of the invention is to provide a compact and easily readable dual meter, the deflectable members of which have a range of movement in an arcuate path of as much as 270° or more.

In accomplishing these objects there is provided, in the specific embodiment of the invention illustrated herein as exemplary thereof, a meter structure comprising a pair of instrument movements which are mounted substantially in end-to-end alignment, closely adjacent each other.

The instrument movements have individual rigid frames which are joined together by a stout, inflexible connector post assemblage in such a manner that the deflectable element of the rear movement may be extended radially and forward, and have a clear and unobstructed path of travel through a very wide arc, of 270° or more. To effect this, the connector post assemblage is located at one side of the movements so as to extend between corresponding side edges thereof where it is out of the way and removed from the path of travel of the said deflectable element.

The aligned instrument movements are mounted in a cylindrical casing so as to be axially one ahead of the other. One end of the casing has a window inside of which an indicia-carrying disk is located, the said disk being mounted on the adjacent instrument movement. The deflectable pointer of this adjacent instrument movement is brought through an opening in the center of the disk and extended radially so as to sweep the periphery of the disk during its deflection, and the disk opening is arranged to prevent obstruction of the pointer by the disk regardless of extent of deflection. The other pointer of the dual meter, connected with the rear instrument movement, after extending radially so as to clear the front movement is brought forward to a point past the periphery of the indicia-carrying disk, and has an indicating portion which travels in a path coextensive with the path of the first pointer. The indicia of the disk are so arranged to extend along the path of travel of both the pointers for reference, so that readings may be taken of the deflected positions of the pointers.

The entire assemblage of two instrument movements, indicia-carrying disk and pointers, is mounted on a rigid transverse wall carried within the casing, to which wall the connector post and rear one of the instrument movements is secured.

To enable the advantages of the structure which makes possible the large scale deflection to be realized, the individual pointers are connected to their respective meter movements through reduction gearing. The pointers are coaxial, and the axes thereof substantially coincide with the axis of the casing, and the meter movements also have a common axis which is spaced from and substantially parallel to the casing axis.

By this organization a simple and compact structure is obtained which does not require any more panel space than a single meter, while at the same time the advantage of two meters is had. Also, the two pointers may use a scale common to both, thereby simplifying the readings considerably.

If it should be necessary to service or repair the instrument movements at any time, these may be removed in their entirety as a unit from the casing and exposed from all sides so that all parts are accessible, and this is a feature of the invention.

Other features and advantages will hereinafter appear.

In the accompanying drawings:

Figure 1 is a front or face view of the improved dual meter of the invention.

Fig. 2 is a transverse sectional view of the meter taken immediately behind the front window and with the indicia-carrying disk and mounting flange removed.

Fig. 3 is a longitudinal section taken on the line 3—3 of Fig. 1, and

Fig. 4 is a transverse section taken on the line 4—4 of Fig. 3.

As shown the present improved dual meter comprises a two-part cylindrical casing 10 having a forward inner portion 11 in which the instrument movements are carried, and having a rear outer portion 12 from the end wall 13 of which a connector-plug fitting 14 projects. The rear portion 12 of the casing is secured to the forward portion 11 by screws 15 which pass through the rear wall 13 and are threaded into the body of the fitting 14, the latter in turn being secured to a relatively thick, rigid transverse wall 16 mounted in the back end of the casing portion 11 and secured thereto by screws 17.

The front end of the casing portion 11 is secured to a mounting flange 18 and has a transparent window 19 across it to permit viewing of the interior of the casing.

In accordance with the invention a pair of instrument movements 20 and 21 are mounted within the casing portion 11 substantially in end-to-end alignment, one ahead of the other, the movement 21 being located next to the window 19 and the movement 20 located to the rear of the movement 21.

The mounting for the movements 20 and 21 is such that a free space, covering a wide area, exists between the movements, said space being unobstructed except at one point, so that a deflectable element carried by the movement 20 may be extended radially therefrom into said free space and may be movable over an extremely wide arc so as to indicate on a scale having a range covering at least 270°. In accomplishing this, there is provided a short, relatively stout and heavy, rigid connector-post assembly 22 which connects together rigid frames 23 and 24 of the instrument movements 20 and 21 respectively, so as to immovably secure these together, the said post assembly extending between corresponding side edge portions of the movements so as to be out of the way and to not obstruct the space between the movements except at one point.

The connector-post assembly 22 comprises a post proper 25 firmly secured to a pair of base plates 26 the latter in turn being fastened to the rigid frame 23 of the instrument movement 20, and also fastened to the rigid transverse wall 16 of the casing portion 11. The post 25 is cut away at 27 to provide clearance for the frame 23 of the movement 20, and is cut away at 28 to provide a nest for the edge portion of the rigid frame 24 of the movement 21. The cutout 28 serves to aid in locking the said edge portion of the frame 24 to the post 25 against relative turning or movement and thus insures rigidity of the combined structures while at the same time resulting in a simplified construction.

The instrument movement 20 has a permanent magnet 29 connected with pole shoes 30 between which the usual magnetic core and movable coil assembly (not shown) is mounted, the latter being carried by pivots 31 turning in bearing plates 32 which are mounted on the instrument frame 23. The instrument movement 21 likewise has a permanent magnet 33 connected with pole shoes 34 surrounding a magnetic core and movable coil assembly 35, the latter being carried by pivots 36 turning in bearing plates 37 secured to the frame 24.

Referring to Fig. 4 the movable coil assembly of the movement 21 is connected to a gear segment 38 engaging and driving a pinion 39 which is mounted on a spindle 40 rotatably carried in a bearing bracket 41 forming part of the instrument frame 24. In a like manner the movable coil assembly of the instrument 20 is geared to drive a spindle 42 rotatably carried in a bearing bracket 43 secured to the instrument frame 23.

The spindles 40 and 42 are substantially coaxial and substantially coincide with the central longitudinal axis of the casing 10 as will be seen from Figs. 3 and 4, and therefore the movable coil assemblies of the instrument movements are offset laterally from the axis of the casing 10 an amount equal to that required to accommodate the spur gearing shown in Fig. 4.

Referring to Figs. 1 and 3, a disk 44 carrying indicia 45 so as to function as a scale, is mounted within the window 19 and between the latter and the instrument movement 21, the disk being fastened by screws 46 to supporting posts 47 which are in turn mounted on the frame 24 of the movement 21. The disk 44 has a central opening 48 to admit a pointer 49, the latter being secured to the spindle 40 and being deflectable over an arc of at least 270° for cooperation with the indicia 45 to provide readings thereby.

In accordance with the invention the indicia 45 may also be used as reference indica for providing readings of the deflection of the instrument movement 20, and for this purpose the disk 44 is made smaller in diameter than the inside diameter of the casing portion 11 so that a substantial space 50 exists between the casing portion and the periphery of the disk. Also in accomplishing this purpose a novel deflectable element 51 is provided, carried by the spindle 42 of the instrument movement 20, the said element having a portion 52 extending generally radially from the spindle through the space provided between the instrument movements 20 and 21. At the end of the radial portion 52 of the deflectable element the latter has a portion 53 extending angularly forward to a point slightly beyond the periphery of the disk 44 and terminating in a pointer portion 54 overlying the disk periphery for cooperation with the indica 45 thereof.

It will be noted that the bearing brackets 41 and 43 and also the connector-post assembly 22 are located or extended to the left of the instrument movements 20 and 21 as viewed in Fig. 3, and as a result both the pointer 49 of the movement 21 and the deflectable element 51 of the movement 20 may swing through an arc of better than 270° and approaching 360°, without meeting with obstruction of any kind except where stops are intentionally provided to limit the deflection. Readings may be taken of the deflection of the instrument movement 21 by noting the position of the pointer 49 with respect to the indica 45, and readings may be taken of the deflection of the movement 20 by noting the position of the pointer portion 54 of the deflectable element 51 with respect to the indicia 45. The deflections of the instrument movement 20 are independent of the deflections of the movement 21, and therefore it will be seen that by the present invention the advantage of two instrument movements is had while at the same time the space required on the instrument panel is no greater than that ordinarily needed for a single instrument movement. Also the readings of the instrument movements may be quickly and conveniently had at a glance, since both pointers read on the same dial or disk 44 and indicia 45 in a conventional manner.

This is of considerable advantage where space is at a premium, as for instance in aircraft and the like, and where readings must be simplified to the maximum degree.

Preferably the window 19 is provided with a central opaque portion 55 which covers over that portion of the structure of the instrument movement 21 which would otherwise be visible through the central opening 48 in the disk 44.

Electrical connections to the instrument movements 20 and 21 may be made in the usual manner, the leads (not shown) being brought to the connector-plug fitting 14 at the rear of the casing 10.

It will be noted that the side walls 56 of the casing portion 12 are extended forwardly so as to overlie and cover the screws 17 by which the transverse wall 16 is secured in the casing portion 11, thus tending to prevent a repair man from inadvertently loosening the screws 17 when it is necessary to remove the casing portion 12 prior to removing the dual meter from the instrument panel on which it is mounted. The overlying wall 56 of the casing portion 12 also prevents loss of the screws 17 if these should inadvertently become loose at any time.

Variations and modifications may be made within the scope of this invention and portions of the improvements may be used without others.

I claim:

1. A dual electric meter comprising a cylindrical casing having a window at one end; a circular scale in the casing behind the window and visible therethrough, said scale being spaced inwardly from the walls of the casing and having an opening at its center; a pair of electric instrument movements one in front of the other and mounted in the casing behind the scale; a deflectable pointer carried by one instrument movement, extending through the central opening in the scale and deflectable over the latter in a circular path; and a deflectable pointer coaxial with and independent of the first pointer and carried by the other instrument movement, extending around both the one instrument movement and the periphery of the scale and deflectable over the latter in a circular path substantially concentric with the path of the first pointer.

2. A unitary, indicating, dual-instrument assemblage adapted to be inserted and mounted as a unit in a tubular casing having a window at its front end, comprising a pair of instrument movements connected together one in back of the other; a disk having indicia along its periphery and a clearance opening in it; means disposed mainly inward of the periphery of the disk, mounting the latter on and in front of the foremost instrument movement; an indicator member connected to said foremost movement, extending through the clearance opening in the disk and movable in a path along the indicia of the disk; a second indicator member independent of the first, connected with the second instrument movement and having a portion extending outside of and past the periphery of the disk, said portion being movable in a path which extends along said indicia and is coextensive with the first named path; and means mounting the rearmost instrument movement in said casing whereby the periphery of the disk is out of contact with the casing.

3. A unitary, indicating, dual-instrument assemblage adapted to be inserted and mounted as a unit in a tubular casing having a window at its front end, comprising a pair of instrument movements having rigid frames; means connecting together the instrument movements one in back of the other, said means including a substantially inflexible post joined to the frames at off-center points; a disk having indicia along its periphery and a clearance opening in it; means disposed mainly inward of the periphery of the disk, mounting the latter on and in front of the foremost instrument movement; an indicator member connected to said foremost movement, extending through the clearance opening in the disk and movable in a path along the indicia of the disk; a second indicator member independent of the first, connected with the second instrument movement and having a portion extending outside of and past the periphery of the disk, said portion being movable in a path which extends along said indicia and is coextensive with the first named path; and means mounting the rearmost instrument movement in said casing whereby the periphery of the disk is out of contact with the casing.

KNUD J. KNUDSEN.

REFERENCES CITED

The following references are of record in the file of this patent:

UNITED STATES PATENTS

| Number | Name | Date |
|---|---|---|
| 309,114 | Warner | Dec. 9, 1884 |
| 606,767 | Rose | July 5, 1898 |
| 1,518,332 | Kloneck | Dec. 9, 1924 |
| 1,646,634 | Sutherland | Oct. 25, 1927 |
| 1,960,241 | Deerwester | May 29, 1934 |
| 2,123,376 | Moeger | July 12, 1938 |
| 2,419,100 | Weaver | Apr. 15, 1947 |

FOREIGN PATENTS

| Number | Country | Date |
|---|---|---|
| 425,494 | Germany | Feb. 20, 1926 |